Figure 1:

April 4, 1961 A. A. TURNBULL 2,978,389
METHOD OF TENSIONING THIN MESHES OF METAL
Filed Feb. 9, 1959

INVENTOR
ANDREW A. TURNBULL

BY
AGENT

2,978,389
METHOD OF TENSIONING THIN MESHES OF METAL

Andrew Alfred Turnbull, Merton Park, London, England, assignor to North American Philips Company, Inc., New York, N.Y., a corporation of Delaware Filed Feb. 9, 1959, Ser. No. 792,131

Claims priority, application Great Britain Mar. 7, 1958

4 Claims. (Cl. 204—24)

This invention relates to a method of tensioning thin metal meshes, more especially meshes for use as electrodes or electrode parts of electron discharge devices. Metal meshes are employed in a variety of electron discharge devices. They are used, for example, as the collector mesh in television camera tubes such as the orthicon, image-orthicon and vidicon; as the modulating mesh in charge modulation storage tubes and as the barrier grid in barrier-grid storage tubes. A metal mesh is also used as the control-grid in the so-called "high-slope" electron guns for cathode ray tubes. In all these applications a planar mesh is required and this is generally obtained by first making the mesh in untensioned form and then tensioning it.

It is known to manufacture an untensioned mesh from electrodeposited copper, the mesh either being electro-formed in a single step or alternatively a thin sheet or film of copper first electro-formed and then photo-etched to produce the mesh. The mesh is then secured around its periphery to a holder or frame, usually circular in shape, by, for example, spot-welding. The mesh in its frame is then tightened by heating it at a temperature of, for example, 900° C. in an inert atmosphere such as hydrogen. At such a temperature a change in the crystalline structure of the electro-formed copper occurs and the mesh tends to shrink but due to the fact that it is secured to its frame the result is that the mesh is tensioned.

An object of the present invention is to provide a method of tensioning metal meshes which does not necessitate heating to a high temperature and is not limited to those metals which shrink when heated.

According to the present invention there is provided a method of tensioning a thin mesh of a first metal, more especially a mesh for use as an electrode or electrode part of an electron discharge device, which method comprises the steps of securing the mesh in an untensioned state to a frame surround and electro depositing onto the mesh a sufficient amount of a second metal in a state of tensile stress to tension the mesh. By this method the mesh can be tightened to such a degree that heat treatment is rendered unnecessary. Although the mesh may be a woven mesh made from wires or narrow metal strips of, for example, stainless steel, the invention is particularly applicable to meshes consisting of a thin metal sheet having a regular array or pattern of holes. The first and second metals may be the same or different.

That many electrodeposits are formed in a condition of stress, generally tensile, has been known for many years. It is also known that many factors, for example temperature, composition and pH of the electrolyte, and current density, cause the stress to vary. Some factors cause the stress to be greater while others reduce it and it is even possible to cause the stress to reverse, for example from a tensile to a compressional stress, by adding certain specific organic compounds. In carrying out the present invention it is required that the second metal and the conditions of the electrodeposition are such that the metal is deposited under tensile stress.

Figure 2:
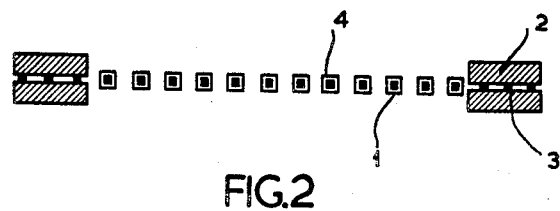

A first example of the method according to the invention will now be described, by way of example, with reference to the diagrammatic drawing in which:

Figure 1 shows on an enlarged scale a cross-sectional view of a collector ring-mesh assembly for use in a vidicon camera tube, the mesh being in an untensioned state, and Fig. 2 shows the mesh tightened after carrying out an electro-deposition in accordance with the invention.

Figure 1 of the drawing shows a mesh 1 of copper having a thickness of seven microns secured at its periphery to a frame or holder surround consstituted by two flat rings 2 and 3 of fernico alloy of approximately 19 mms. internal diameter which are welded together after the mesh has been located between them. As an alternative, a single flat ring may be employed and the mesh spot-welded thereto at a number of points around the periphery of the mesh. At this stage the mesh will be slack as shown in exaggerated form in Figure 1.

The collector ring-mesh assembly is then introduced into an electrolytic bath and nickel deposited on the mesh in a layer 4 having a thickness of about two microns (see Figure 2). This deposition tensions the mesh thus rendering the mesh tight and planar.

Details of the electrodeposition are as follows.

Composition of the electrolyte:

| | | |
|---|---|---|
| Nickel sulphate (NiSO$_4$.7H$_2$O) | gms./litre | 250 |
| Nickel chloride (NiCl$_2$.6H$_2$O) | do | 37.5 |
| Boric acid (H$_3$BO$_3$) | do | 25 |
| Sodium fluoride (NaF) | do | 12.5 |
| Temperature of the electrolyte | ° C | 30–40 |
| pH of the electrolyte | | 5.2–5.8 |
| Current density | ma./cm.$^2$ | 20 |

Instead of depositing two microns of nickel, as an alternative an 0.5 micron layer of nickel covered by a layer of rhodium 1.5 microns thick may be deposited. In this case both the nickel and rhodium deposits contribute to the tightening of the mesh.

A second detailed example will now be described as applied to the tensioning of a thin metal mesh constituting the modulating grid electrode of a charge modulation storage tube.

The electrode consisted of a 4 inch diameter 250 mesh nickel grid having a thickness of 0.0005 inch. The mesh is secured to an annular nickel surround by spot welding and then tensioned by electrodepositing onto the grid mesh rhodium in a thickness of about 0.0001 inch.

The details of the electrodeposition are as follows.

Composition of the electrolyte:

The electrolyte used was a rhodium plating solution called "Baker Platinum Rhodium Plating Solution" available commercially from the Baker Platinum Division of Engelhard Industries.

| | | |
|---|---|---|
| Temperature of the electrolyte | ° C | 45 |
| Current density | ma./cm.$^2$ | 20 |

For a copper mesh to be used as the control grid in a so-called "high-slope" electron gun for a cathode ray tube electrodeposited nickel or cobalt, for example, can be used to tighten the mesh.

What is claimed is:

1. A method of manufacturing a metallic screen structure comprising a taut metallic screen member and a rigid frame member having an opening, said screen member being stretched taut over said opening and secured at positions around said opening to said frame member; comprising the steps, placing said screen in a slack condition over said opening, securing said screen to said frame member at points positioned around said opening, electroplating said thus mounted screen in an electro-deposition bath with an amount of a metal under a state of tensile stress sufficient to cause said screen to be stretched taut over said opening.

2. A method of manufacturing a metallic screen structure comprising a taut metallic screen member and a rigid frame member having an opening, said screen member being stretched taut over said opening and secured at positions around said opening to said frame member; comprising the steps, placing a copper metal screen in a slack condition over said opening, securing said screen to said frame member at points positioned around said opening, electroplating said thus mounted screen in an electro-deposition bath with an amount of nickel under a state of tensile stress sufficient to cause said screen to be stretched taut over said opening.

3. The method of claim 2 wherein rhodium is deposited on the nickel in a state of tensile stress.

4. A method of manufacturing a metallic screen structure comprising a taut metallic screen member and a rigid frame member having an opening, said screen member being stretched taut over said opening and secured at positions around said opening to said frame member; comprising the steps, placing a nickel metal screen in a slack condition over said opening, securing said screen to said frame member at points positioned around said opening, electroplating said thus mounted screen in an electro-deposition bath with an amount of rhodium under a state of tensile stress sufficient to cause said screen to be stretched taut over said opening.

References Cited in the file of this patent

UNITED STATES PATENTS

| | | |
|---|---|---|
| 2,047,369 | Hickok | July 14, 1936 |
| 2,568,713 | Brenner | Sept. 25, 1951 |
| 2,640,789 | Hausner | June 2, 1953 |
| 2,795,032 | Kernsetter | June 11, 1957 |
| 2,820,077 | Salauze | Jan. 14, 1958 |
| 2,858,463 | Koda et al. | Oct. 28, 1958 |
| 2,870,068 | Schaer | Jan. 20, 1959 |

FOREIGN PATENTS

| | | |
|---|---|---|
| 941,885 | Germany | Apr. 19, 1956 |

OTHER REFERENCES

Metal Finishing, February 1956, pages 52–56.